United States Patent
Xiang

(10) Patent No.: US 12,256,297 B2
(45) Date of Patent: Mar. 18, 2025

(54) VEHICLE-TO-EVERYTHING ACCESS METHOD, DEVICE, AND STORAGE MEDIUM

(71) Applicant: ZTE Corporation, Shenzhen (CN)

(72) Inventor: Haitao Xiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 438 days.

(21) Appl. No.: 17/619,853

(22) PCT Filed: Jun. 16, 2020

(86) PCT No.: PCT/CN2020/096418
§ 371 (c)(1),
(2) Date: Dec. 16, 2021

(87) PCT Pub. No.: WO2021/088375
PCT Pub. Date: May 14, 2021

(65) Prior Publication Data
US 2022/0353651 A1  Nov. 3, 2022

(30) Foreign Application Priority Data
Nov. 8, 2019  (CN) .......................... 201911088399.2

(51) Int. Cl.
*H04W 4/40*  (2018.01)
*H04W 4/50*  (2018.01)

(52) U.S. Cl.
CPC ............... *H04W 4/40* (2018.02); *H04W 4/50* (2018.02)

(58) Field of Classification Search
CPC ............ H04W 4/40; H04W 4/44; H04W 4/46
See application file for complete search history.

(56) References Cited

U.S. PATENT DOCUMENTS

| | | | |
|---|---|---|---|
| 2011/0032868 A1* | 2/2011 | Huang | ................ H04L 12/4633 370/328 |
| 2015/0365829 A1 | 12/2015 | Grayson et al. | |
| 2018/0049207 A1 | 2/2018 | Lim et al. | |

(Continued)

FOREIGN PATENT DOCUMENTS

| | | | | |
|---|---|---|---|---|
| CN | 101983317 A | * | 3/2011 | ......... G01C 21/3661 |
| CN | 105101255 A | | 11/2015 | |
| CN | 105398431 A | | 3/2016 | |

(Continued)

OTHER PUBLICATIONS

3GPP Technical Specification Group Radio Access Network. "Discussion on NR V2X mode 2 resource allocation," 3GPP TSG-RAN WG2 Meeting #105, Mar. 2019, pp. 1-4.

(Continued)

*Primary Examiner* — Khalid W Shaheed
(74) *Attorney, Agent, or Firm* — Vivacqua Crane, PLLC

(57) ABSTRACT

A method and a device for accessing a Vehicle-to-Everything (V2X) network, and a non-transitory computer-readable storage medium are disclosed, the method may include: acquiring a network code for identification; and in response to, a determination that the network code is not found in a V2X resource list, performing an adaptive configuration; and the adaptive configuration is determined based on historical V2X communication configuration information.

15 Claims, 9 Drawing Sheets

(56) References Cited

U.S. PATENT DOCUMENTS

2018/0324560 A1  11/2018  Xu et al.

FOREIGN PATENT DOCUMENTS

| CN | 205249281 U | 5/2016 | |
|---|---|---|---|
| CN | 106559446 A | 4/2017 | |
| CN | 107040960 A | 8/2017 | |
| CN | 107071187 A | 8/2017 | |
| CN | 107295456 A | 10/2017 | |
| CN | 107483654 A | 12/2017 | |
| CN | 107846434 A | 3/2018 | |
| CN | 107925890 A | 4/2018 | |
| CN | 108476497 A | 8/2018 | |
| CN | 108886767 A | 11/2018 | |
| CN | 109644378 A | 4/2019 | |
| CN | 110213620 A | 9/2019 | |
| CN | 110366136 A | 10/2019 | |
| EP | 2876954 A1 | 5/2015 | |
| WO | WO-2017003621 A1 * | 1/2017 | ............ H04W 68/00 |
| WO | 2018021784 A1 | 2/2018 | |
| WO | 2018165572 A1 | 9/2018 | |

OTHER PUBLICATIONS

European Patent Office. Extended European Search Report for EP Application No. 20885654.2, mailed Jul. 1, 2022, pp. 1-8.
International Searching Authority. International Search Report and Written Opinion for PCT Application No. PCT/CN2020/096418 and English translation, mailed Sep. 2, 2020, pp. 1-11.
3GPP Technical Specification Group Radio Access Network, Cell Selection/Reselection for NR V2X, 3GPP RAN-WG2 Meeting #107bis, issued Oct. 3, 2019, pp. 1-7.
The State Intellectual Property Office of People's Republic of China. First Search Report for CN Application No. 201911088399.2 and English translation, mailed Jan. 19, 2021, pp. 1-7.
The State Intellectual Property Office of People's Republic of China. First Office Action for CN Application No. 201911088399.2 and English translation, mailed Jan. 27, 2021, pp. 1-11.
Chae, et al. Radio Resource Allocation Scheme for Device-to-Device Communication in Cellular Networks Using 5 Fractional Frequency Reuse, IEEE 17th Asia-Pacific Conference on Communications, Oct. 2011, pp. 58-62.

* cited by examiner

| Country information 1 | Operator information 1 | Frequency 1 | Bandwidth 1 | Frequency band 1 | Resource pool 1 |
|---|---|---|---|---|---|
| Country information 2 | Operator information 2 | Frequency 2 | Bandwidth 2 | Frequency band2 | Resource pool 2 |
| ...... | ...... | ...... | ...... | ...... | ...... |
| ...... | ...... | ...... | ...... | ...... | ...... |

VEHICLE-TO-EVERYTHING ACCESS METHOD, DEVICE, AND STORAGE MEDIUM

CROSS-REFERENCE TO RELATED APPLICATION

This application is a national stage filing under 35 U.S.C. § 371 of international application number PCT/CN2020/096418, filed Jun. 16, 2020, which claims priority to Chinese patent application No. 201911088399.2, filed Nov. 8, 2019. The contents of these applications are incorporated herein by reference in their entirety.

TECHNICAL FIELD

Embodiments of the present disclosure relate to, but are not limited to vehicle-to-everything, in particular to a method and a device for accessing a V2X network, and a non-transitory computer-readable storage medium.

BACKGROUND

With the rapid development of communication technologies, wireless communication technologies have been extensively used. Vehicle-to-everything (V2X) communication is an important application of wireless communication. V2X is an important link in smart transportation and a key technology for future smart transportation systems. V2X network enables vehicle-to-vehicle (V2V), vehicle-to-infrastructure (V2I), vehicle-to-pedestrian (V2P) and vehicle-to-network (V2N) can communications.

At present, although the Third Generation Partnership Project (3GPP) recommends an operating frequency band at around 5.9 GHz for V2X networks, different regions or countries have different configurations of V2X wireless resources. Therefore, problem in communication would occur to a V2X device when roaming between different regions or countries, or when establishing communication with another V2X device having a different network configuration.

SUMMARY

The following provides be a summary of the topics detailed in this disclosure. This summary is not intended to limit the scope of protection of the claims.

There is provided a method and a device for accessing a V2X network, and a storage medium in the embodiments of the present disclosure.

According to an embodiment of the present disclosure, there is provided a method for accessing a V2X network, which may include: acquiring a network code for identification; and performing an adaptive configuration in response to a determination that the network code is not found in a V2X resource list, the adaptive configuration being determined based on historical V2X communication configuration information.

According to another embodiment of the present disclosure, there is provided a method for accessing a V2X network, which may include: performing a determination as to whether or not a subsequent piece of historical data of V2X communication is null, and loading historical V2X communication configuration of V2X communication in response to a determination that the subsequent piece of historical data of V2X communication is not null; performing a further determination as to whether or not V2X communication is in a normal state; accessing a V2X network in response to a determination that the V2X communication is in a normal state; and returning to the step of performing a determination as to whether or not a subsequent piece of historical data of V2X communication to the subsequent piece of historical data of V2X communication is null in response to a determination that the V2X communication is in an abnormal state.

According to yet another embodiment of the present disclosure, there is provided a method for determining a V2X configuration, which may include: performing a determination as to whether or not a subsequent piece of historical data of V2X communication is null, and extracting a network code for identification in response to a determination that the subsequent piece of historical data of V2X communication is not null; traversing a V2X resource list, and determining a location where the network code is located in the list, and extracting a plurality of pieces of V2X configuration information before or after the location where the network code is located.

According to yet another embodiment of the present disclosure, there is provided a device for accessing a V2X network, which may include: a power management module configured to supply power; a V2X module configured to perform V2X communication; a radio frequency module configured to transmit and receive data at a frequency band and bandwidth corresponding to the V2X configuration information, and a system bus configured to provide communication channels for each module.

According to yet another embodiment of the present disclosure, there is provided an electronic device, which may include: a memory, a processor, and a computer program stored on the memory and executable by the processor, which when executed by the processor, causes the processor to carry out steps of the above method.

According to yet another embodiment of the present disclosure, there is provided a non-transitory computer-readable storage medium storing a computer-executable instruction, which when executed by a processor, causes the processor to carry out steps of the above-mentioned method.

Other features and advantages of the present disclosure will be described in the following description, and partly become apparent from the description, or understood by practicing the present disclosure. The objectives and other advantages of the present disclosure can be realized and attained by the structure specified in the description and claims as well as the appended drawings.

BRIEF DESCRIPTION OF DRAWINGS

The accompanying drawings are used to provide a further understanding of the technical schemes of the present disclosure and constitute a part of the description. The accompanying drawings, together with embodiments of the present disclosure, are intended to illustrate the technical schemes of the present disclosure, rather than constitute a limitation to the technical schemes of the present disclosure.

REFERENCE NUMBER LIST

Figure 1:
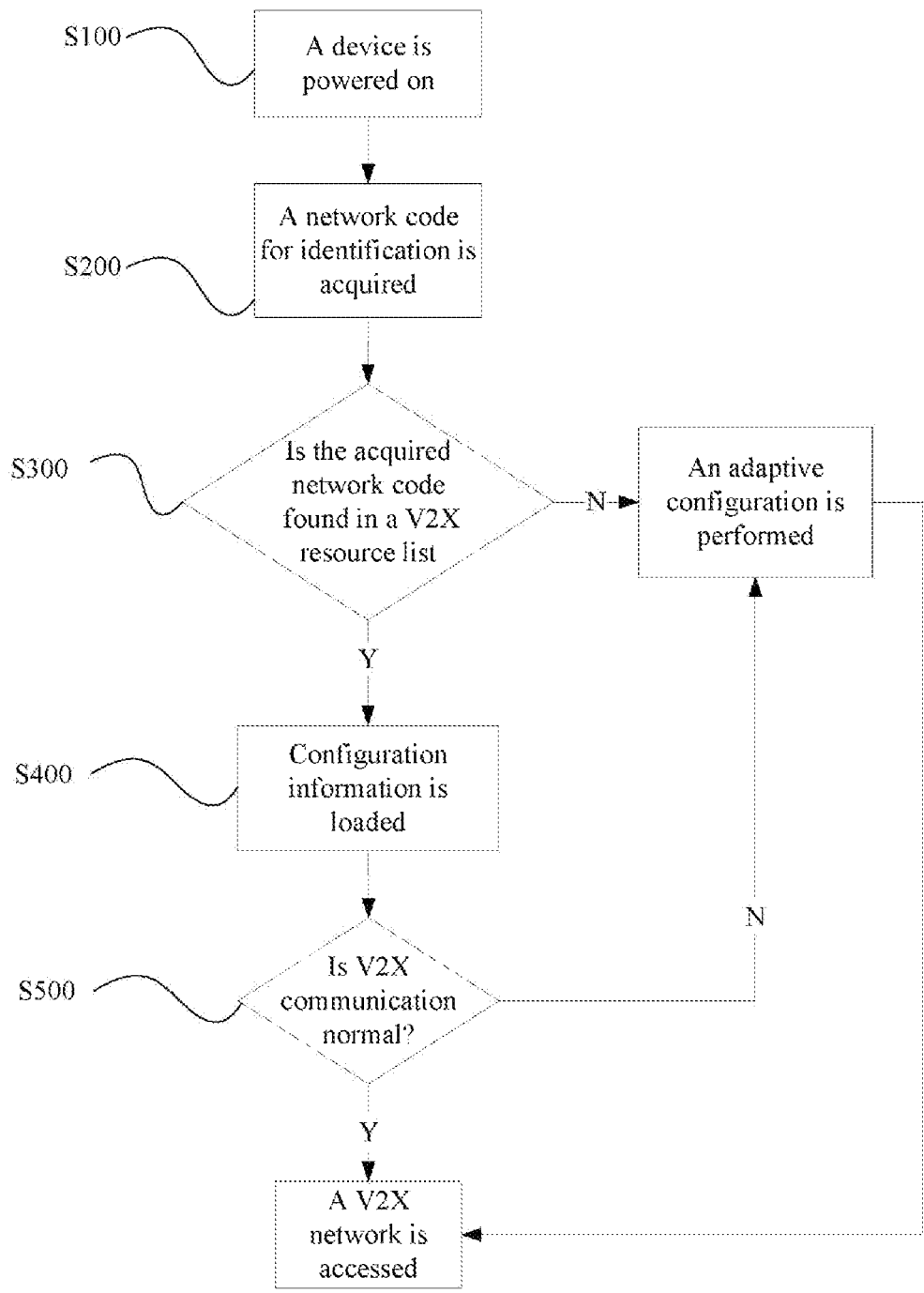
FIG. 1 shows a schematic flowchart of a method for accessing a V2X network according to an embodiment of the present disclosure.

110—power management module; 120—LTE module; 130—V2X module; 140—RF module; 150—system bus.

DETAILED DESCRIPTION

In order to make the objectives, technical schemes and advantages of the present disclosure clearer, the present disclosure will be further described in detail in conjunction with accompanying drawings and embodiments. It should be understood that the specific embodiments described here are resented for purpose of illustration only but not of limitation for the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In the description of the present disclosure, unless otherwise clearly defined, terms such as "defined", "arranged", "mounted", and "connected" should be understood in a broad sense. Those having ordinary skill in the art can determine the specific meaning of the above terms in the embodiments of the present disclosure in accordance with the specific contents of the technical schemes.

Although the Third Generation Partnership Project (3GPP) recommends an operating frequency band at around 5.9 GHz for V2X networks, different regions or countries have different configurations of V2X wireless resources. Therefore, problem in communication would occur to a V2X device when roaming between different regions or countries, or when establishing communication with another V2X device having a different network configuration.

In view of this, embodiments of the present disclosure provide a method and a device for accessing a V2X network, and a non-transitory computer-readable storage medium. A current network code is acquired through a long-term evolution LTE device such as an onboard entertainment system or an automobile Telematics BOX (TBOX). A historical V2X communication configuration of a device, and a built-in V2X resource list that stores V2X communication configuration information of most regions and countries around the world are used to realize V2X communication of a V2X device in various regions and countries, and communication between various V2X devices.

The application scenarios of the embodiments of the present disclosure will be introduced below.

In general cases, a V2X device should be able to support a V2X communication configuration of the local region or country. However, when the V2X device leaves the original region or country, or due to different configurations of V2X wireless resources in different regions or countries, the V2X device may not be able to perform V2X communication in a new region or country, or, the V2X device may not be able to communicate with another V2X device having different V2X communication configurations. The methods according to the embodiments of the present disclosure can be applied to the above-mentioned scenarios, but are not limited thereto.

The embodiments of the present disclosure are further described below in conjunction with the drawings. According to an embodiment of the present disclosure, there is provided a method for accessing a V2X network.

FIG. 1 is a flowchart of the method for accessing a V2X network. The method shown in FIG. 1 at least includes the following steps S200 to S500.

At step S100, a device is powered on for initialization.

In an embodiment, the device, upon powering on, may initiate or update V2X-related configuration information and databases.

At step S200, a network code for identification is acquired.

In an embodiment, the network code may be acquired through a network module, e.g., an LTE module. Because V2X technology is a branch of an LTE network, countries having LTE networks are more likely to deploy the V2X technology in terms of frequency spectrum. The network code may be any information code or data code used for identification, such as a mobile country code (MCC) for identifying country information, or a mobile network code (MNC) for identifying operator information.

At step S300, the acquired network code is looked up in a V2X resource list for communication configuration information; an adaptive configuration method is performed in case that the acquired network code is not found in the V2X list, and S400 is performed in case that the acquired network code is found in the V2X list.

In an embodiment, the acquired network code may be traversed through the V2X resource list to find whether or not it is in the list. The V2X resource list may be built in a device, and current V2X communication configuration information of most regions and countries all over the world is stored in the list, which may specifically include MCC, MNC, frequencies, bandwidths, frequency bands, resource pools, etc.

At step S400, the V2X communication configuration information that matches with the acquired network code is loaded, that is, MCC, MNC, frequencies, bandwidths, frequency bands, resource pools, and other information that are matched with the V2X resource list are configured in a device, and communication is performed.

In an embodiment, when a network code, e.g., MCC1 is matched in the V2X resource list, MNC1, frequency 1, bandwidth 1, frequency band 1, resource pool 1, and other information corresponding to that network code (e.g., MCC1) are loaded into a device, and data is then received, monitored and transceived with the above frequency band and bandwidth.

At step S500, a determination is performed as to whether or not V2X communication is in a normal state; in case that the V2X communication is in a normal state, it is indicated that the matched V2X communication configuration is applicable to a current environment, and then, a device accesses to V2X for communication in the current environment; and in case that the V2X communication is in an abnormal state, an adaptive configuration method is performed.

Figure 2:
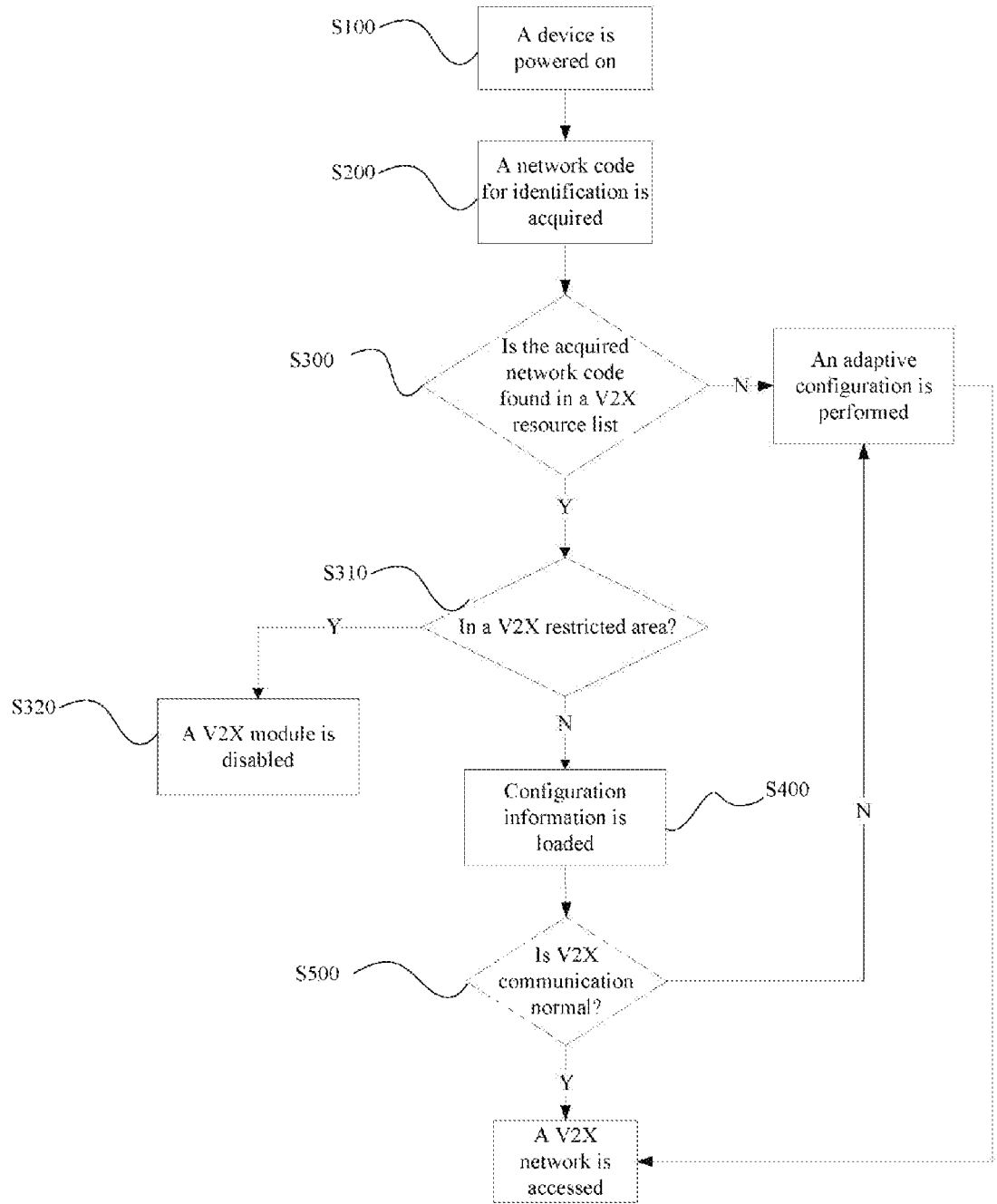
FIG. 2 shows a schematic flowchart of a method for accessing a V2X network according to another embodiment of the present disclosure.

FIG. 2 shows a method for accessing a V2X network according to another embodiment of the present disclosure. As shown in FIG. 2, the steps of the method are generally the same as those in the foregoing embodiment, with the difference being that, the method further includes steps S310 and S320 subsequent to step S300.

At step S310, a determination is performed as to whether or not communication through a V2X device is prohibited in the current region or country; if yes, step S320 is performed; and if not, step S400 is performed.

At step S320, a V2X module is powered off.

In an embodiment, a V2X radio frequency (RF) module of the device may be powered off or a flight mode may be activated to deactivate the V2X communication.

It is possible to refer to the description of in the previous embodiment for steps S100, S200, S300, S400, and S500, which will not be repeated here.

Figure 3:
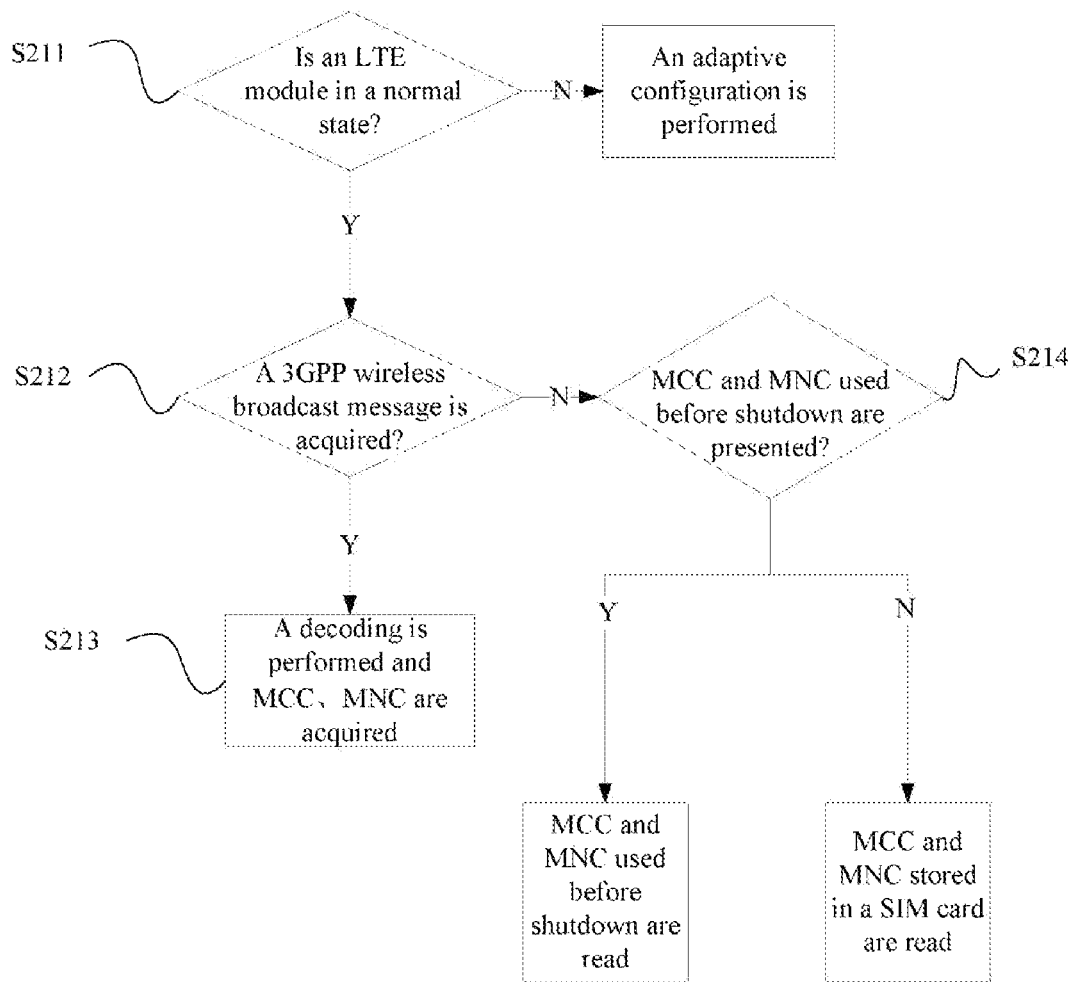
FIG. 3 shows a schematic flowchart for acquiring a network code according to an embodiment of the present disclosure.

A method for acquisition of a network code according to an embodiment of the present disclosure will be described in detail below in conjunction with FIG. 3. As shown in FIG. 3, the method for acquiring a network code used for identification at least includes the following steps S211 to S214.

At step S211, a determination is performed as to whether or not a network module, e.g., an LTE module is in a normal state; in case that the network module is in an abnormal state, an adaptive configuration method is performed; and in case that the network module is in a normal state, step S212 is performed.

In some embodiments, an adaptive configuration method is performed once the network module is in an abnormal state, i.e., the network module does not operate properly.

At step S212, a determination is performed as to whether or not a wireless broadcast message is acquired; if yes, step S213 is performed; and if not, step S214 is performed, where the wireless broadcast message is, for example, a 3GPP wireless broadcast message.

In some embodiments, step S214 may be performed in the case that an LTE module is in a normal state, but a wireless broadcast message is not acquired for some reasons, such as signal failure or signal acquisition timeout.

At step S213, decoding is performed and a network code is acquired.

In some embodiments, specific network code information is determined by decoding MCC and MNC information in a corresponding system information block 1 (SIB1).

At step S214, a determination is performed as to whether or not a network code, such as MCC and MNC used by a device before the last shutdown of the device, is presented; if yes, MCC and MNC used before the last shutdown are read and retrieved; and if not, MCC and MNC stored in a SIM card are read and retrieved.

In some embodiments, a network code previously used by a device or a network code stored in a SIM card is suitable for use in the current environment. Steps for determination of a network code according to another embodiment of the present disclosure will be described in detail below in conjunction with FIG. 4.

Figure 4:
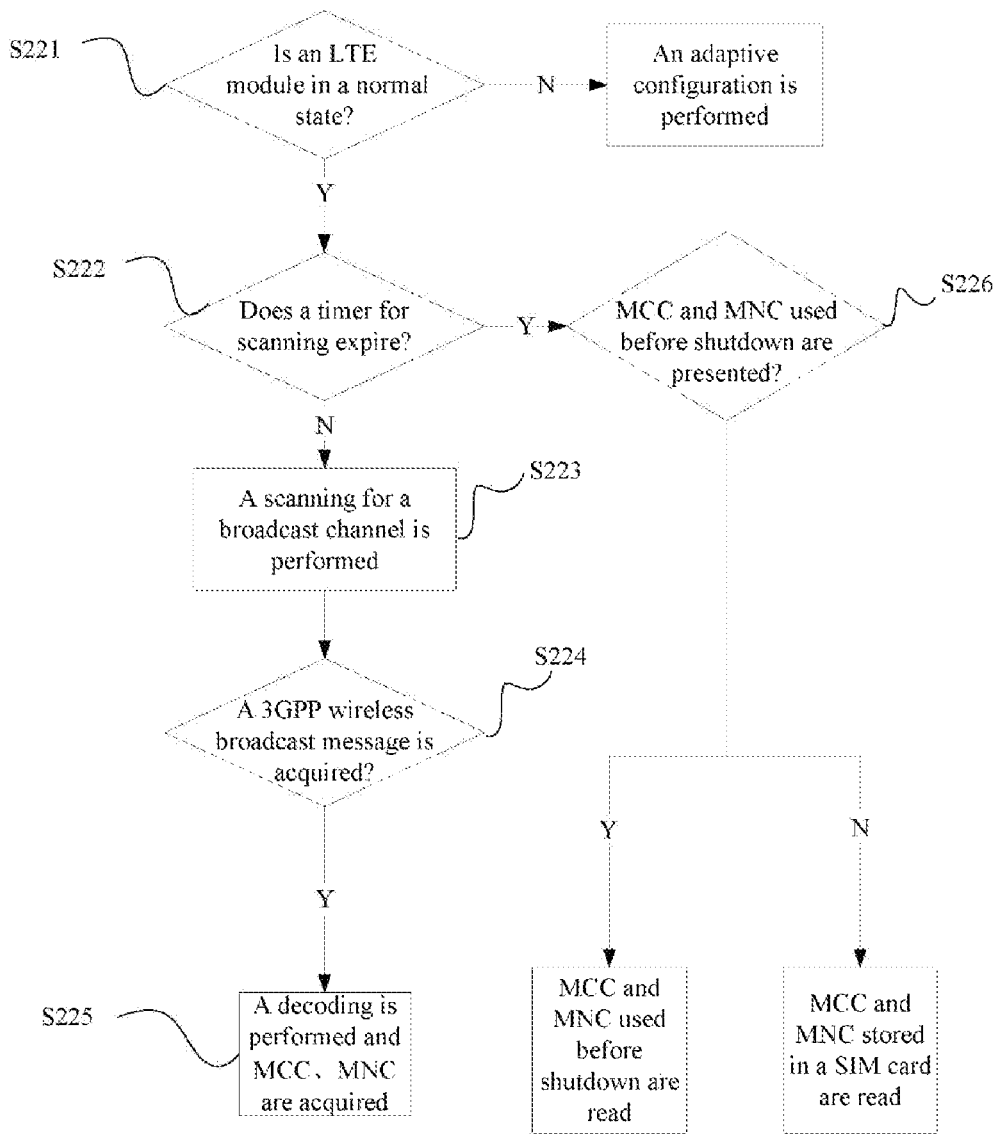
FIG. 4 shows a schematic flowchart for acquiring a network code according to another embodiment of the present disclosure.

As shown in FIG. 4, the method for acquiring a network code for identification at least includes the following steps S221 to S225.

At step S221, a determination is performed as to whether or not a network module, e.g., an LTE module is in a normal state; in case that the network module is in an abnormal state, an adaptive configuration method is performed; and in case that the network module is in a normal state, step S222 is performed.

In some embodiments, the adaptive configuration method is performed when the network module is in an abnormal state, that is, the network module does not operate properly.

At step S222, a determination is performed as to whether or not a timer for scanning expires, and if not, step S223 is performed; and if yes, step S226 is performed. In some embodiments, a timer can be added to determine whether or not an expiration happens in order to avoid an infinite loop due to the case that no time limit is set for scanning of a broadcast channel. When it is determined that a timer expires, step S2226 is performed to determine whether or not a network code, such as MCC and MNC used by a device before the last shutdown of the device, is present; if yes, MCC and MNC used before the last shutdown of the device, are read and retrieved; and if not, MCC and MNC stored in a SIM card are read and retrieved.

At step S223, scanning for a broadcast channel is performed.

In some embodiments, an RF unit of an LTE module may be configured to scan the current environment for the existence of a wireless signal such as an LTE, WCDMA, GSM signal, or the like.

At step S224, a determination is performed as to whether or not a wireless broadcast message is acquired; if yes, step S225 is performed; and if not, the method returns to step S222, where the wireless broadcast message is, for example, a 3GPP wireless broadcast message.

At step S225, decoding is performed and a network code is acquired.

In some embodiments, specific network code information is determined by decoding MCC and MNC information in a corresponding system information block 1 (SIB1).

Figure 5:
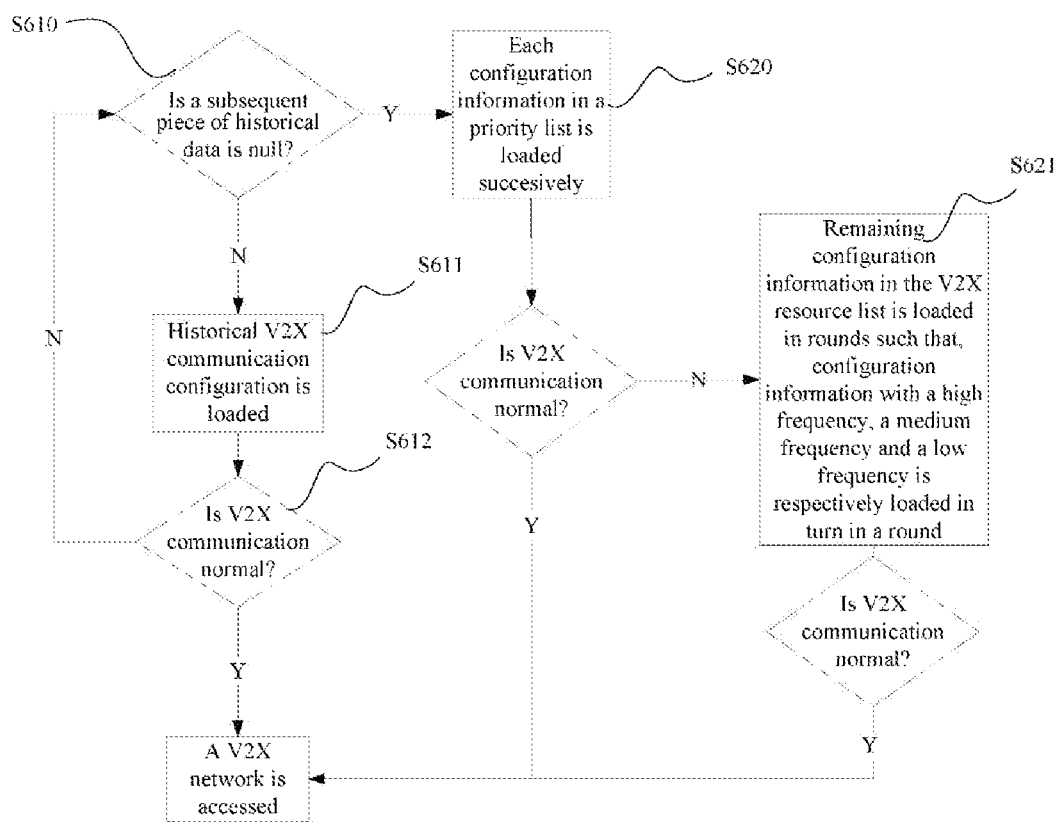
FIG. 5 shows a schematic flowchart for adaptive configuration according to an embodiment of the present disclosure.

An adaptive configuration method according to an embodiment of the present disclosure will be described in detail below with reference to FIG. 5. The adaptive configuration method shown in FIG. 5 at least includes the following steps S610 to S621.

At step S610, a determination is performed as to whether or not a subsequent piece of historical data is null, that is, a determination is performed on each piece of data in a historical database as to whether or not data is present; if yes, step S620 is performed; and if not, step S611 is performed.

In some embodiments, historical data may be a record of V2X communication configuration that has ever been used by a V2X device, or a record of country and location information that has ever been used by a V2X device, including MCC, latitude and longitude coordinates, and other information. This information indicates a location where a device is most likely to be subsequently used. In the case that a 3GPP broadcast message is not acquired, or MCC and MNC used by a device before the device was shut down, and MCC and MNC stored in a SIM are not matched, a prioritized scanning of historical GDB can shorten the wireless resource configuration time as much as possible.

At step S611, historical V2X communication configuration is loaded.

At step S612, a determination is performed as to whether or not V2X communication is in a normal state; in case that the V2X communication is in a normal state, it is indicated that a matched V2X communication configuration is applicable to a current environment, and then, a device accesses to V2X for communication in the current environment; and in case that the V2X communication is in an abnormal state, the method returns to step S610 to determine whether or not a subsequent piece of historical data is null until the device accesses to a V2X network or none historical data allows access to a V2X network.

At step S620, configuration information in a priority list is loaded piece by piece to determine whether or not V2X communication is in a normal state; in case that the V2X communication is in a normal state, it is indicated that the matched V2X communication configuration is applicable to the current environment, and then, a device accesses to a V2X network for communication in the current environment; and in case that the V2X communication is in an abnormal state, step S621 is performed.

In some embodiments, the configuration information in the priority list may be priority configuration information configured by a device manufacturer, or priority information configured by an operator, or configuration information that is likely to be used and derived by a device from historical data.

At step S621, the remaining configuration information is loaded in sequence to determine whether or not V2X communication is in a normal state; in case that the V2X communication is in a normal state, it is indicated that the matched V2X communication configuration is applicable to the current environment, and then, a device accesses to V2X network for communication in the current environment.

In some embodiments, the remaining configuration information may be communication configuration information other than the configuration information used by a device before the device was shut down, configuration information corresponding to MCC stored in SIM, historical V2X communication configuration information, and configuration information in the above-mentioned priority list. In particular, the remaining configuration information may be the remaining configuration information other than the above-mentioned information in the V2X resource list. In order to shorten the wireless configuration time, remaining configuration information in the V2X resource list is loaded in rounds such that, configuration information with a high frequency, a medium frequency, and a low frequency is respectively loaded in turn in a round. Specifically, each of the remaining frequency of 5.9 G is loaded one after another in rounds such that, configuration information with a high frequency, a medium frequency and a low frequency is respectively loaded in turn in a round, and stops for 30 s every 2 minutes, to save power consumption.

Figure 6:
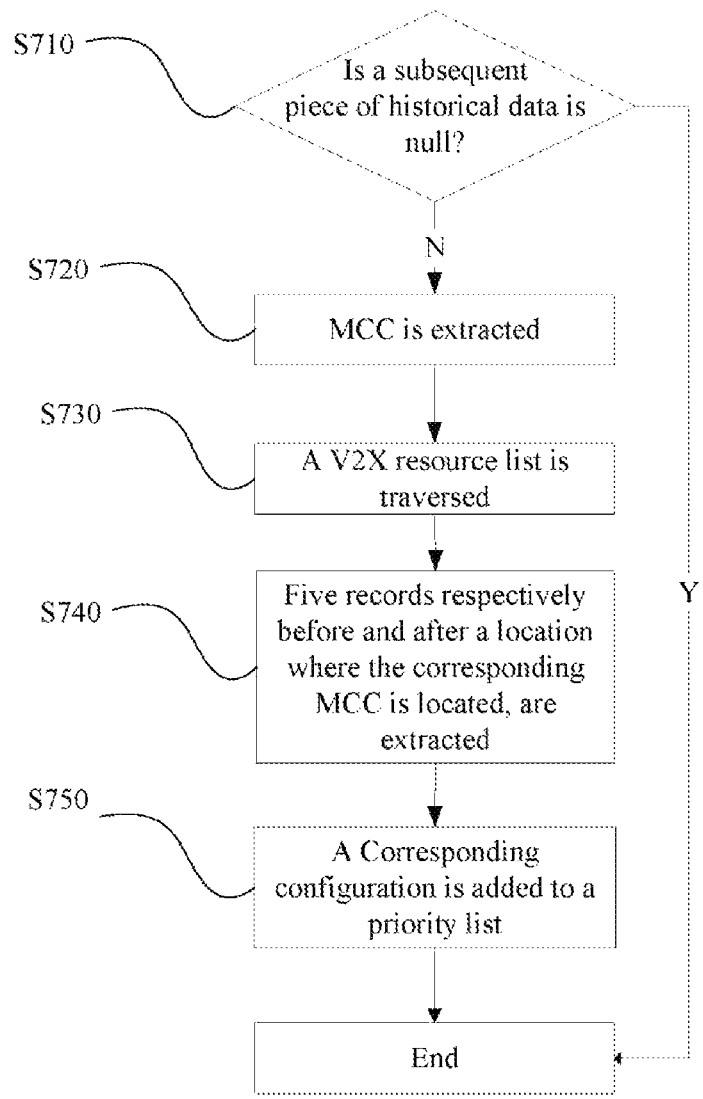
FIG. 6 shows a schematic flowchart of generation and update of a priority list according to an embodiment of the present disclosure.

A method for generation of a priority list according to an embodiment of the present disclosure will be described in detail below in conjunction with FIG. 6. As shown in FIG. 6, the method for generating the priority list at least includes the following steps S710 to S750.

At step S710, a determination is performed as to whether or not a subsequent piece of historical data is null, and if yes, the method ends; and if not, step S720 is performed.

In some embodiments, the historical data may be historical information configured by a device manufacturer or configured by a telecommunication operator, or communication configuration information that has ever been used by a device.

At step S720, MCC is extracted.

In some embodiments, a current record of MCC information is extracted from the historical data. The record may refer to national geographic location information that has ever been used by a device, or may refer to national geographic location information pre-configured by a device manufacturer or by a telecommunication operator.

At step S730, a V2X resource list is traversed.

In some embodiments, the V2X resource list is traversed and queried for a corresponding MCC. The V2X resource list may be arranged in ascending order of numbers, and at the same time the principle in which a country code is arranged by the adjacency in geographic location of the country indicated by the country code to a country of interest, is followed.

At step S740, several adjacent records in the list where the corresponding MCC is located are extracted.

In some embodiments, wireless resource information of five countries before or after the corresponding MCC may be extracted as candidate records. Records before or after a corresponding MCC country code may be understood as possible neighbor countries to a country of interest due to the principle in which a country code is arranged by the adjacency in geographic location of the country indicated by the country code to the country of interest.

At step S750, the records are added to a preferentially configured frequency list, in particular, a matched wireless resource record is added as a preferentially configured frequency to the priority list for prioritized scanning in case of failure in matching.

Figure 7:
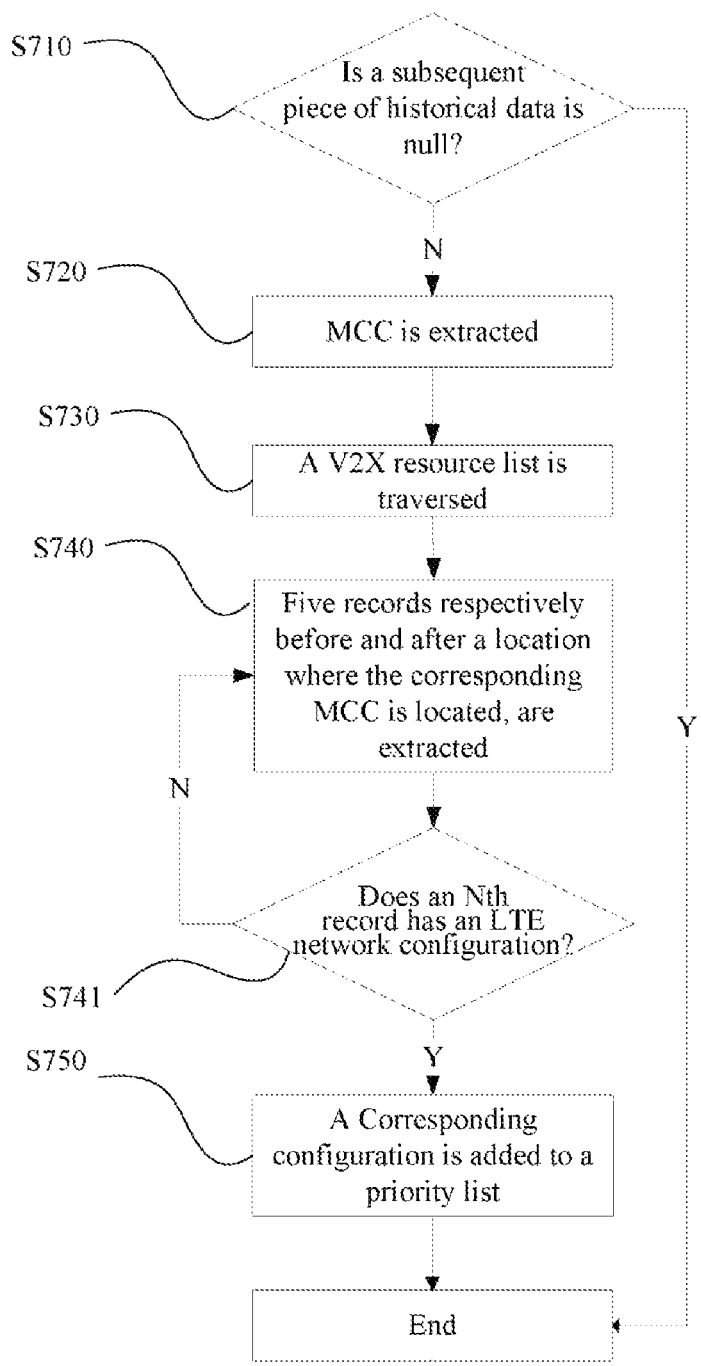
FIG. 7 shows a schematic flowchart of generation and update of a priority list according to another embodiment of the present disclosure.

FIG. 7 discloses a method for generating a priority list according to another embodiment of the present disclosure.

As shown in FIG. 7, the steps of the method are generally the same as those in FIG. 6, with the difference by additionally including step S741 subsequent to step S740:

At step S741, a determination is performed on each extracted record as to whether or not an extracted record has an LTE network configuration; and if yes, step S750 is performed.

It is possible to refer to the description in the previous embodiment for steps S710, S720, S730, S740, and S750, which will not be repeated here.

Figures 8, 9:
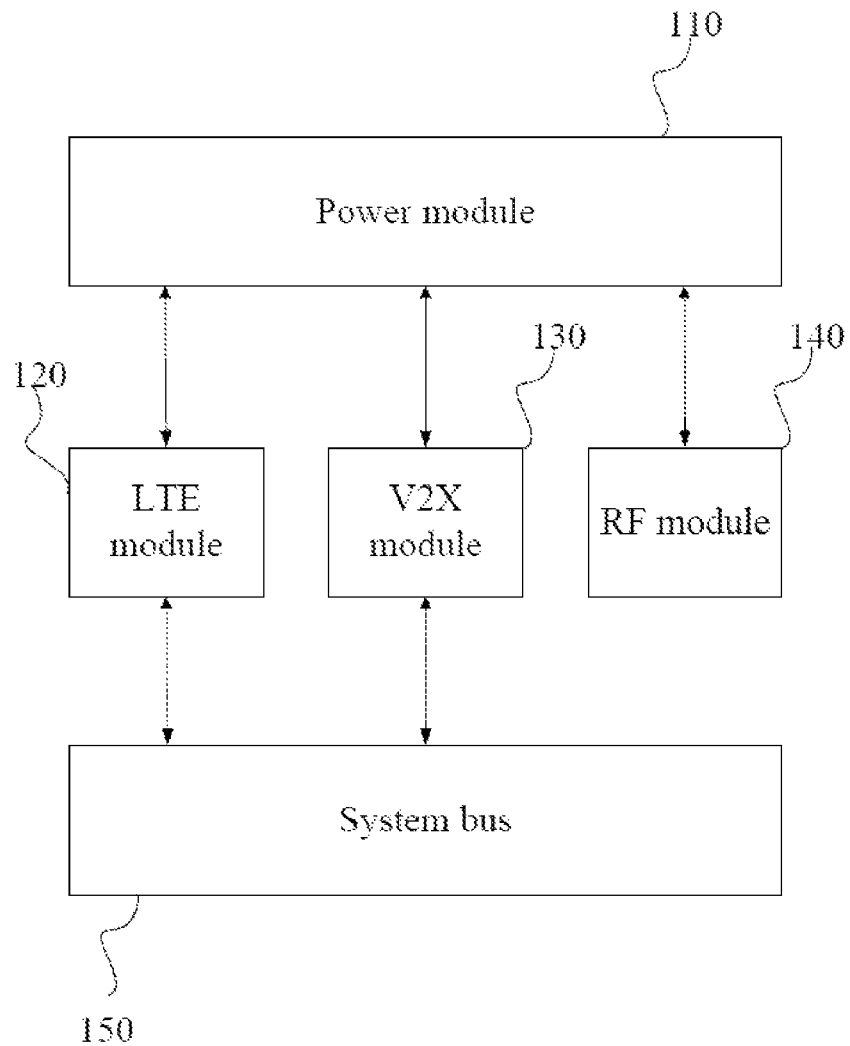
FIG. 8 shows a V2X resource list according to an embodiment of the present disclosure.
FIG. 9 shows a device for accessing a V2X network according to an embodiment of the present disclosure.

A method of generating a V2X resource list according to an embodiment of the present disclosure will be described in detail below in conjunction with FIG. 8. As shown in FIG. 8, the method for generating the V2X resource list at least includes the following steps S820 to S860.

At step S810, country information is acquired.

The country information is a unique identification of a country. Various identifications can be used, such as coordinate latitude and longitudes, numbers, codes, or the like. MCC is used by way of example in this embodiment of the present disclosure uses, but not as a limitation.

At step S820, telecommunication operator information is acquired.

The telecommunication operator information is a unique identification of a telecommunication operator. Various identifications can be used, for example, numbers, names, characters, and identification coded by specific compilation rules. MNC is used in this embodiment by way of example, but not as limitation.

At step S830, frequency information is acquired.

The frequency information refers to each physical frequency at which a V2X network operates.

At step S840, bandwidth information is acquired.

The bandwidth information refers to a bandwidth at which a V2X network operates. The current 3GPP standard has two types: 10 MHz bandwidth and 20 MHz bandwidth.

At step S850, frequency band information is acquired.

The frequency band information refers to a frequency band at which a V2X network operates. The current 3GPP standard defines a B46D (5150-5925 MHz) band with a channel bandwidth of 10-20 MHz and B47 (5855-5925 MHz) band with a channel bandwidth of 10-20 MHz.

At step S860, a resource pool is acquired.

The resource pool refers to resource blocks for data transmission and scheduling in V2X communication, and TDM (Time Division Multiplexing) resources. A V2X resource list is generated by the above-mentioned acquired information.

A device for accessing a V2X network according to another embodiment of the present disclosure will be described in detail below with reference to FIG. 9.

As shown in FIG. 9, the device for accessing a V2X network at least includes a power management module, an LTE module, a V2X module, and an RF module. The communication modules are connected and interacted through a system bus.

The power management module 110 is configured to provide current and voltage input for the system to ensure that each physical module is supplied with power and operates properly, and other application processes can be carried out properly. The LTE module 120, usually is a TBOX or is integrated within an on-board entertainment system, which provides LTE connection capabilities for vehicles or infrastructure. The LTE module is an optional device. In some scenarios or settings, a V2X module may be provided merely without an LTE module. The V2X module 130 is configured to provide a V2X service and V2X communication. The RF module 140, that is, a radio frequency module, is configured to transmit and receive data in a specific frequency band and bandwidth according to wireless resources configured by V2X. The system bus 150 is configured to provide communication channels for different physical modules in the system.

According to an embodiment of the present disclosure, there is provided a method for accessing a V2X network, which at least includes the following steps: powering on a device, and acquiring a network code for identification through a network module; looking up the network code in a V2X resource list; loading corresponding communication configuration information in the V2X resource list to the network code in case that the network code is found in the V2X resource list; performing adaptive configuration in case that the network code is found in the V2X resource list; and accessing the current V2X network when the V2X communication is in a normal state, where the adaptive configuration is determined based on a historical V2X communication configuration.

According to another embodiment of the present disclosure, there is provided a method for accessing a V2X network, at least including the following steps: successively performing a determination as to whether or not a subsequent piece of historical V2X communication data is null; loading historical V2X communication configuration stored in a device in case that the data is not null; performing a determination as to whether or not the V2X communication with the device is in a normal state, and accessing a V2X network in the case that the V2X communication is in a normal state; and returning to the step of performing a determination as to whether or not a subsequent piece of historical data is null in case that the V2X communication is in an abnormal state.

According to yet another embodiment of the present disclosure, there is provided a method for determining V2X configuration, including at least the following steps: successively performing a determination as to whether or not a subsequent piece of historical V2X communication data is null, and extracting a network code for identification in case that the data is not null; traversing a V2X resource list to determine a location of the network code in the resource list, and extracting several pieces of V2X configuration information before and after the corresponding location of the network code.

According to yet another embodiment of the present disclosure, there is provided a device for accessing a V2X network, which at least includes: a power management module configured to supply a current and voltage to the device; a V2X module configured to provide a V2X service and V2X communication; an RF module configured to transmit and receive data within a specific frequency band and bandwidth based on a V2X wireless communication configuration, and a system bus configured to provide communication channels for the above physical modules.

Figure 10:
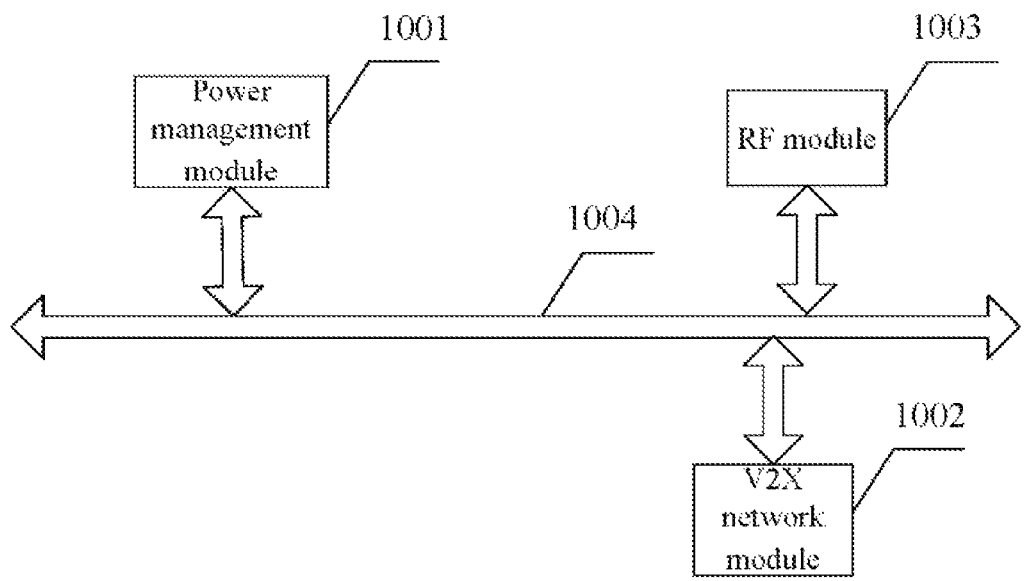
FIG. 10 shows a device for accessing a V2X network according to another embodiment of the present disclosure.

Referring to FIG. 10, according to yet another embodiment of the present disclosure, there is provided a V2X device, which includes: a power management module 1001 configured to supply power; a V2X module 1002 configured to perform V2X communication; a RF module 1003 configured to transmit and receive data within a specific frequency band and bandwidth based on a V2X wireless communication configuration, and a system bus 1004 configured to provide communication channels for the above modules.

Figure 11:
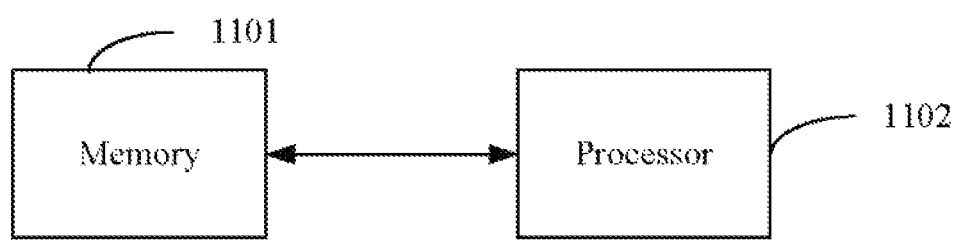
FIG. 11 shows an electronic device according to an embodiment of the present disclosure.

Referring to FIG. 11, according to yet another embodiment of the present disclosure, there is provided an electronic device, which includes: a memory 1101, a processor 1102, and a computer program stored on the memory 1101 and executable by the processor 1102, and the computer program, when executed by the processor 1102, causes the processor 1102 to carry out steps of the above-mentioned methods. In some embodiments, the electronic device may be a V2X device.

According to yet another embodiment of the present disclosure, there is provided a non-transitory computer-readable storage medium storing computer-executable instructions which when executed by a processor, causes the process to carry out steps of the above-mentioned methods.

According to the embodiments of the present disclosure, a V2X network device is enabled to automatically load a local V2X communication configuration as required in different regions or countries based on a network code at a current location, a built-in V2X resource list in the device, and historical V2X communication configuration, so as to realize V2X communication of the V2X device in different regions or countries. At least one of the technical problems in related technologies is solved, including the problem in communication that happens to a V2X device when accessing a V2X network, or when establishing communication with another V2X device, due to different regions and countries having different configurations of V2X wireless resources.

A person having ordinary skill in the art shall understand that all or some of the steps, functional modules/units in the system, and devices in the methods disclosed above can be implemented as software, firmware, hardware and their appropriate combination. In the hardware implementation, the division between functional modules/units mentioned in the above description does not necessarily correspond to the division of physical components. For example, one physical component may have a plurality of functions, or one function or step may be executed by several physical components in cooperation. Some physical components or all physical components can be implemented as software executed by a processor, such as a central processing unit, a digital signal processor, or a microprocessor, or as hardware, or as an integrated circuit, such as an application-specific integrated circuit. Such software may be distributed on a computer-readable medium, and the computer-readable medium may include a computer storage medium (or a non-transitory medium) and a communication medium (or a transitory medium). It is well-known to a person having ordinary skill in the art that the term "computer storage medium" includes volatile and nonvolatile, removable and non-removable mediums implemented by any method or technology for storing the information, such as, computer-readable instructions, data structures, program modules or other data. The computer storage medium includes, but is not limited to a random access memory (RAM), a read-only memory (ROM), an erasable programmable read-only memory (EPROM), a flash memory or other memory techniques; a compact disc read-only memory (CD-ROM), a digital video disk (DVD) or other optical storage; a tape cartridge, a magnetic tape, a disk storage or other magnetic storage devices; or any other medium that may be configured to store desired information and may be accessed by a computer. In addition, as is well known to those having ordinary skill in the art, communication media usually contain computer-readable instructions, data structures, computer program modules, or other data in a modulated data signal such as a carrier wave or other transmission mechanism, and may include any information delivery medium.

The above is a specific description of some embodiments of the present disclosure, but the present disclosure is not limited to the above-mentioned embodiments. Those having ordinary skill in the art can make various equivalent modifications or alterations without departing from the scope of the present disclosure. Equivalent modifications or alterations are all within the scope defined by the claims of the present disclosure.

The invention claimed is:

1. A method for accessing a V2X network, comprising:
acquiring a network code for identification; and
in response to, a determination that the network code is not found in a V2X resource list, performing an adaptive configuration; wherein, the adaptive configuration is determined based on historical V2X communication configuration information;
wherein performing the adaptive configuration comprises:
performing a determination as to whether or not a subsequent piece of historical data of V2X communication is null;
in response to, a determination that the piece of historical data of V2X communication is null, loading priority configuration information; and
in response to, a determination that V2X communication is in a normal state, accessing the V2X network,
wherein the priority configuration information is determined based on a matching between historical data of V2X communication and the V2X resource list;
and determination of the priority configuration information comprises:
performing a determination as to whether or not a subsequent piece of historical data of V2X communication is null, and in response to, a determination that the piece of historical data is not null, extracting a network code corresponding to the piece of historical data of V2X communication;
traversing the V2X resource list, and extracting, from the V2X resource list, corresponding V2X configuration information at a location adjacent to a location where the network code is located; and
adding the corresponding V2X configuration information to a priority list.

2. The method of claim 1, further comprising:
in response to, a determination that the network code is found in the V2X resource list, loading configuration information corresponding to the network code in the V2X resource list; and
in response to, a determination that V2X communication is in a normal state, accessing the V2X network.

3. The method of claim 2, further comprising:
in response to, a determination that the V2X communication is in an abnormal state, performing the adaptive configuration.

4. The method of claim 1, wherein acquiring the network code for identification comprises:
in response to, a determination that a network module is in an abnormal state, performing the adaptive configuration.

5. The method of claim 1, wherein acquiring the network code for identification comprises:
acquiring, by a network module, the network code for identification;
in response to, a determination that the network module is in a normal state, performing a further determination as to whether or not a wireless broadcast message is acquired;
in response to, a determination that the wireless broadcast message is acquired, performing a decoding and acquiring the network code; and
in response to, a determination that no wireless broadcast message is acquired, reading a network code that is previously used or reading a network code from a SIM card.

6. The method of claim 1, wherein acquiring the network code for identification comprises:
in response to, a determination that a network module is in a normal state, performing a further determination as to whether or not a timer for scanning expires; and
in response to, a determination that the timer for scanning does not expire, performing a decoding and acquiring the network code.

7. The method of claim 1, wherein acquiring the network code for identification comprises:
in response to, a determination that a network module is in a normal state, performing a further determination as to whether or not a timer for scanning expires; and
in response to, a determination that the timer for scanning expires, reading a network code that is previously used, or reading a network code from a SIM card.

8. The method of claim 2, wherein
in response to, a determination that the network code is found in the V2X resource list, performing a further determination as to whether or not a current position is within a V2X restricted area;
in response to, a determination that the current position is within the V2X restricted area, disabling a V2X network connection; and
in response to, a determination that the current position is not within the V2X restricted area, loading configuration information corresponding to the network code in the V2X resource list.

9. The method of claim 1, wherein performing the adaptive configuration further comprises:

performing a determination as to whether or not a subsequent piece of historical data of V2X communication is null;
in response to, a determination that the historical data of V2X communication is not null, loading a historical V2X communication configuration;
performing a further determination as to whether or not V2X communication is in a normal state;
in response to, a determination that the V2X communication is in a normal state, accessing the V2X network; and
in response to, a determination that the V2X communication is in an abnormal state, returning to performing a determination as to whether or not a subsequent piece of historical data of V2X communication is null.

10. The method of claim 1, wherein performing the adaptive configuration comprises:
performing a determination as to whether or not a subsequent piece of historical data of V2X communication is null;
in response to, a determination that the piece of historical data of V2X communication is null, loading the priority configuration information; and
in response to, a determination that V2X communication is in an abnormal state, successively loading remaining configuration information in the V2X resource list.

11. The method of claim 10, wherein
in response to, a determination that V2X communication is in an abnormal state, loading remaining configuration information in the V2X resource list in rounds such that, configuration information with a high frequency, a medium frequency and a low frequency is respectively loaded in turn in a round.

12. The method of claim 10, wherein determination of the priority configuration information comprises:
performing a determination as to whether or not a subsequent piece of historical data of V2X communication is null, and in response to, a determination that the piece of historical data is not null, extracting a network code corresponding to the piece of historical data of V2X communication;
traversing the V2X resource list, and extracting, from the V2X resource list, corresponding V2X configuration information at a location adjacent to the location where the network code is located; and
adding the corresponding V2X configuration information to the priority list.

13. The method of claim 1, wherein determination of the priority configuration information comprises:
performing a determination as to whether or not a subsequent piece of historical data of V2X communication is null, and in response to, a determination that the piece of historical data is not null, extracting a network code corresponding to the piece of historical data of V2X communication;
traversing the V2X resource list, and extracting, from the V2X resource list, corresponding V2X configuration information at a location adjacent to the location where the network code is located; and
successively performing a determination whether or not each corresponding V2X configuration information has an LTE network configuration, and in response to, a determination that V2X configuration information has an LTE network configuration, adding the V2X configuration information to the priority list.

14. An electronic device, comprising: a memory, a processor, and a computer program that is stored in the memory and executable by the processor, which when executed by the processor, causes the processor to carry out a method for accessing a V2X network, comprising:
acquiring a network code for identification; and
in response to, a determination that the network code is not found in a V2X resource list, performing an adaptive configuration; wherein,
the adaptive configuration is determined based on historical V2X communication configuration information;
wherein performing the adaptive configuration comprises:
performing a determination as to whether or not a subsequent piece of historical data of V2X communication is null;
in response to, a determination that the piece of historical data of V2X communication is null, loading priority configuration information; and
in response to, a determination that V2X communication is in a normal state, accessing the V2X network,
wherein the priority configuration information is determined based on a matching between historical data of V2X communication and the V2X resource list;
and determination of the priority configuration information comprises:
performing a determination as to whether or not a subsequent piece of historical data of V2X communication is null, and in response to, a determination that the piece of historical data is not null, extracting a network code corresponding to the piece of historical data of V2X communication;
traversing the V2X resource list, and extracting, from the V2X resource list, corresponding V2X configuration information at a location adjacent to a location where the network code is located; and
adding the corresponding V2X configuration information to a priority list.

15. A non-transitory computer-readable storage medium storing a computer-executable instruction, which when executed by a processor, causes the processor to carry out a method for accessing a V2X network, comprising:
acquiring a network code for identification; and
in response to, a determination that the network code is not found in a V2X resource list, performing an adaptive configuration; wherein,
the adaptive configuration is determined based on historical V2X communication configuration information;
wherein performing the adaptive configuration comprises:
performing a determination as to whether or not a subsequent piece of historical data of V2X communication is null;
in response to, a determination that the piece of historical data of V2X communication is null, loading priority configuration information; and
in response to, a determination that V2X communication is in a normal state, accessing the V2X network,
wherein the priority configuration information is determined based on a matching between historical data of V2X communication and the V2X resource list;
and determination of the priority configuration information comprises:
performing a determination as to whether or not a subsequent piece of historical data of V2X communication is null, and in response to, a determination that the piece of historical data is not null, extracting a network code corresponding to the piece of historical data of V2X communication;
traversing the V2X resource list, and extracting, from the V2X resource list, corresponding V2X configuration information at a location adjacent to a location where the network code is located; and adding the corresponding V2X configuration information to a priority list.

\* \* \* \* \*